United States Patent [19]
Miller et al.

[11] Patent Number: 5,617,501
[45] Date of Patent: Apr. 1, 1997

[54] SHIELD BOND STRAIN CONNECTOR FOR FIBER OPTIC CLOSURE

[75] Inventors: James R. Miller, Austin; Ellwyn J. Schroeder, Georgetown, both of Tex.

[73] Assignee: Minnesota Mining and Manufacturing Company, St. Paul, Minn.

[21] Appl. No.: 414,181

[22] Filed: Mar. 31, 1995

[51] Int. Cl.$^6$ .................. G02B 6/00; H01R 4/66
[52] U.S. Cl. .............. 385/134; 385/135; 385/136; 439/99
[58] Field of Search .................. 385/135, 136, 385/134, 137; 439/98, 99, 391, 411, 423, 435, 623; 174/78, 88 R

[56] References Cited

U.S. PATENT DOCUMENTS

| | | | |
|---|---|---|---|
| 1,980,141 | 11/1934 | Gregor | 206/43 |
| 3,632,069 | 1/1972 | Thayer et al. | 248/56 |
| 3,654,584 | 4/1972 | Gillemot et al. | 339/14 R |

(List continued on next page.)

FOREIGN PATENT DOCUMENTS

| | | |
|---|---|---|
| 0367477 | 5/1990 | European Pat. Off. . |
| 2273386 | 12/1975 | France . |
| 3611647 | 10/1987 | Germany . |

(List continued on next page.)

OTHER PUBLICATIONS

Article entitled "Low Temperature Reversible 'Splice Loss' Accompanied by Cable CM Protrusion" by Gabor Kiss, Michael Zammit, Osman Gebizlioglu, Phil Grimado, Mike Hiavaty, Casey Wieczorek of Bellcore, 445 South St. Morristown, NJ 07960, and Greg Karl, NYNEX TRG, 140 West St., NY,NY 10007, not dated.
Article entitled "A Good Splice May Not Be As Good As You Think . . . "By Matthew Robinson, Outside Plant, pp. 36–38, Dec., 1994.

Brochure entitled "Goes Wherever Fiber Optic Cable Takes You." by Coyote Closure, P.O. Box 91129 Cleveland, OH 44101, dated 1995.
3M Brochure "2524–F Fusion Splice Insert" Issue 1, Jun. 1991.
3M Brochure "Fibrlok™ 2524 Splice Organizer Tray". Dated 1991.

*Primary Examiner*—Rodney B. Bovernick
*Assistant Examiner*—Hemang Sanghavi
*Attorney, Agent, or Firm*—Gary L. Griswold; Walter N. Kirn; Gerald F. Chernivec

[57] ABSTRACT

A shield bond strain connector for a cable which has strength members therein, such as a fiber optic telecommunications cable having an outer jacket surrounding the strength members and optical fibers, the connector having (i) an inner clamping element positioned against an inner surface of the cable jacket, with a first mounting bolt attached to the inner clamping element, and a prong formed along an end of the inner clamping element, (ii) an outer clamping element positioned against an outer surface of the cable jacket, having a hole therein receiving the first mounting bolt, and being forcibly urged against the cable jacket toward the inner clamping element, (iii) a clamping plate having a second mounting bolt thereon, and (iv) a shield bond extension element having first, second and third holes therein, the first hole receiving the first mounting bolt, the second hole receiving the prong, affixing the extension element to the inner and outer clamping elements, while the third hole receives the second mounting bolt, securely fastening the strength members between the clamping plate and the extension element. The first mounting bolt extends the same direction as the second mounting bolt. The extension element has a narrowed end portion which is interposed between the inner and outer clamping elements, with the first hole being formed in the narrowed end portion. A flange formed on the clamping plate provides a positive stop and a friction fit with the top edge of the shield bond extension element. Each of these elements is preferably formed of a metallic material, such as tin-plated brass. The connector extends the shield bond and provides strain relief to the strength members located within the cable jacket.

19 Claims, 9 Drawing Sheets

U.S. PATENT DOCUMENTS

| | | | |
|---|---|---|---|
| 3,753,204 | 8/1973 | Thompson et al. | 339/14 R |
| 3,787,797 | 1/1974 | Kurz | 339/95 R |
| 4,289,288 | 9/1981 | Gransberry et al. | 248/56 |
| 4,373,776 | 2/1983 | Purdy | 350/96.2 |
| 4,489,830 | 12/1984 | Charlebois et al. | 206/316 |
| 4,561,708 | 12/1985 | Sorlien et al. | 339/14 L |
| 4,679,896 | 7/1987 | Krafcik et al. | 350/96.2 |
| 4,793,681 | 12/1988 | Barlow et al. | 350/96.2 |
| 4,799,757 | 1/1989 | Goetter | 385/135 |
| 4,840,449 | 6/1989 | Ghandeharizadeh | 350/96.2 |
| 4,854,661 | 8/1989 | Cooper et al. | 350/96.2 |
| 4,895,525 | 1/1990 | Leonardo | 439/99 |
| 4,898,448 | 2/1990 | Cooper | 350/96.2 |
| 4,927,227 | 5/1990 | Bensel, III et al. | 350/96.2 |
| 5,059,748 | 10/1991 | Allen et al. | 174/87 |
| 5,071,220 | 12/1991 | Ruello et al. | 385/135 |
| 5,074,635 | 12/1991 | Justice et al. | 385/95 |
| 5,097,529 | 3/1992 | Cobb et al. | 385/135 |
| 5,185,845 | 2/1993 | Jones | 385/135 |
| 5,222,183 | 6/1993 | Daems et al. | 385/135 |
| 5,249,253 | 9/1993 | Franckx et al. | 385/135 |
| 5,258,578 | 11/1993 | Smith et al. | 174/93 |
| 5,278,933 | 1/1994 | Hunsinger et al. | 385/135 |
| 5,280,556 | 1/1994 | Jones | 385/139 |
| 5,288,946 | 2/1994 | Jackson et al. | 174/74 |
| 5,323,478 | 6/1994 | Milanowski et al. | 385/135 |
| 5,323,480 | 6/1994 | Mullaney et al. | 385/135 |
| 5,363,466 | 11/1994 | Milanowski et al. | 385/135 |
| 5,375,185 | 12/1994 | Hermsen et al. | 385/135 |
| 5,440,665 | 8/1995 | Ray et al. | 385/135 |
| 5,440,666 | 8/1995 | Burek et al. | 385/135 |

FOREIGN PATENT DOCUMENTS

| | | | |
|---|---|---|---|
| 4104530 | 5/1992 | Germany . | |
| 4104529 | 8/1992 | Germany . | |
| 4213181 | 9/1992 | Germany | H02G 15/007 |
| PCT/GB93/00157 | 1/1993 | WIPO | G02B 6/44 |
| PCT/GB93/01120 | 5/1993 | WIPO | H02G 15/013 |
| PCT/US93/05742 | 6/1993 | WIPO | H02G 15/05 |
| PCT/GB93/01942 | 9/1993 | WIPO | H02G 15/013 |
| PCT/US94/04198 | 4/1994 | WIPO | G02B 6/44 |
| PCT/US94/04232 | 4/1994 | WIPO | G02B 6/44 |

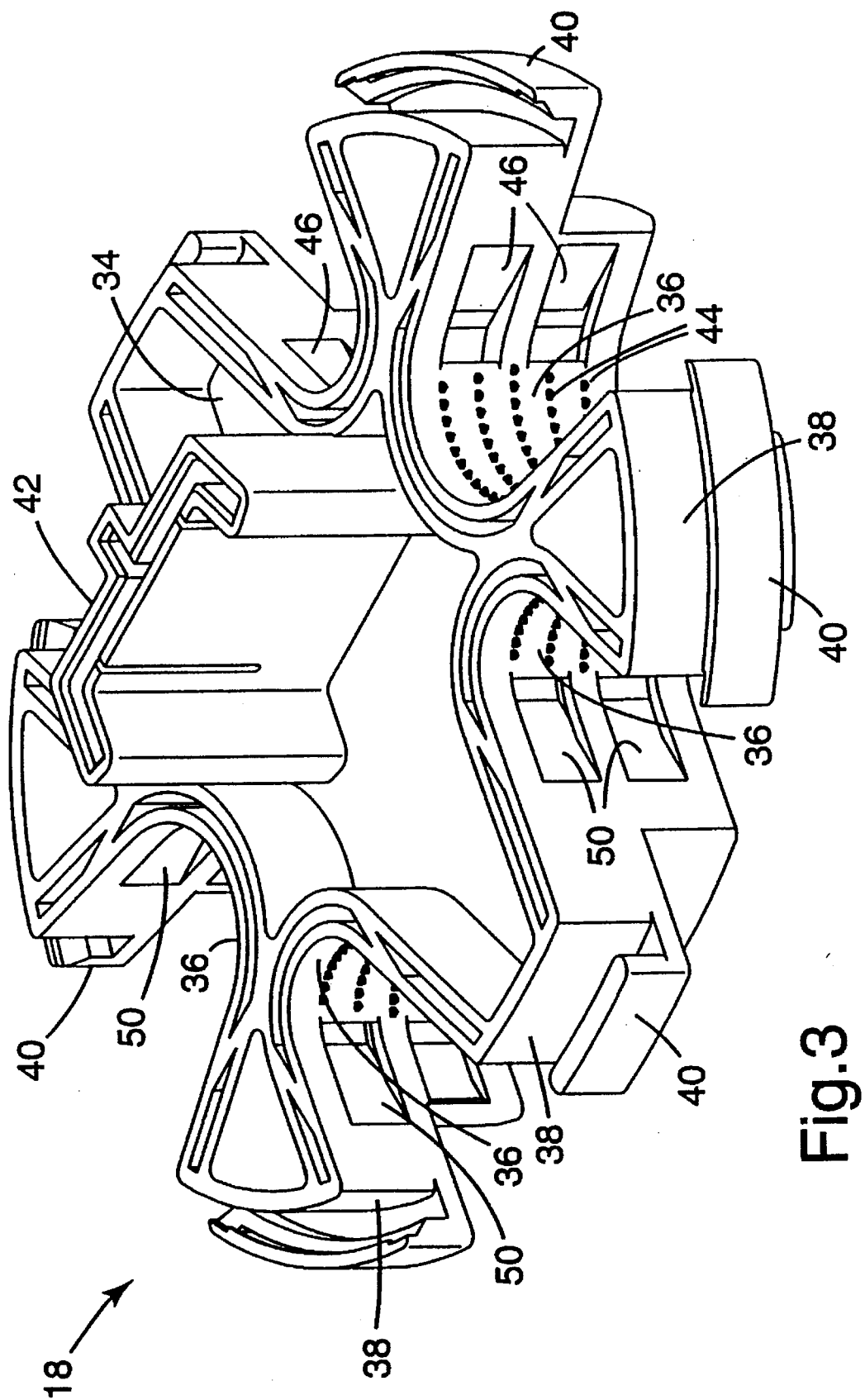

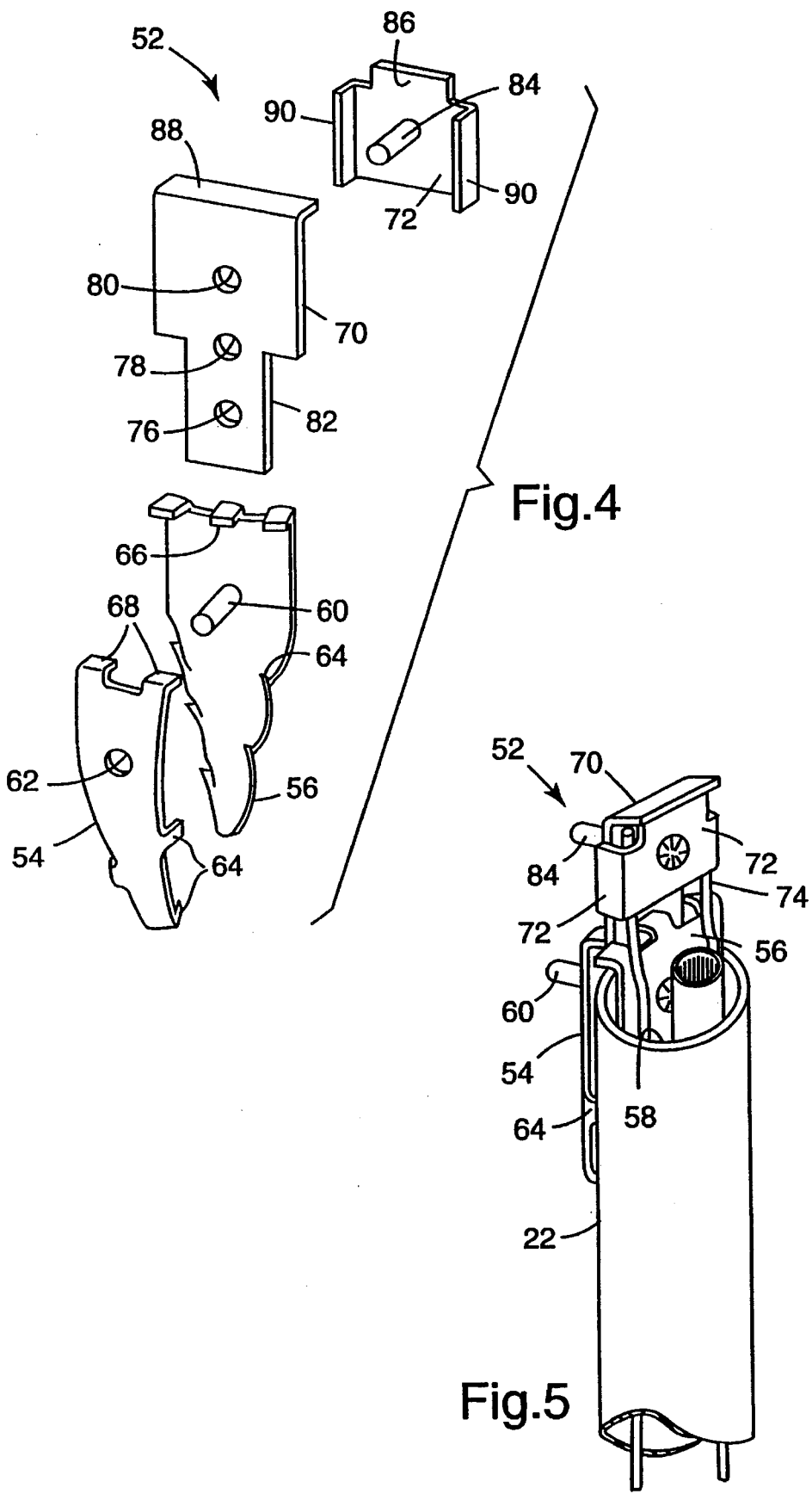

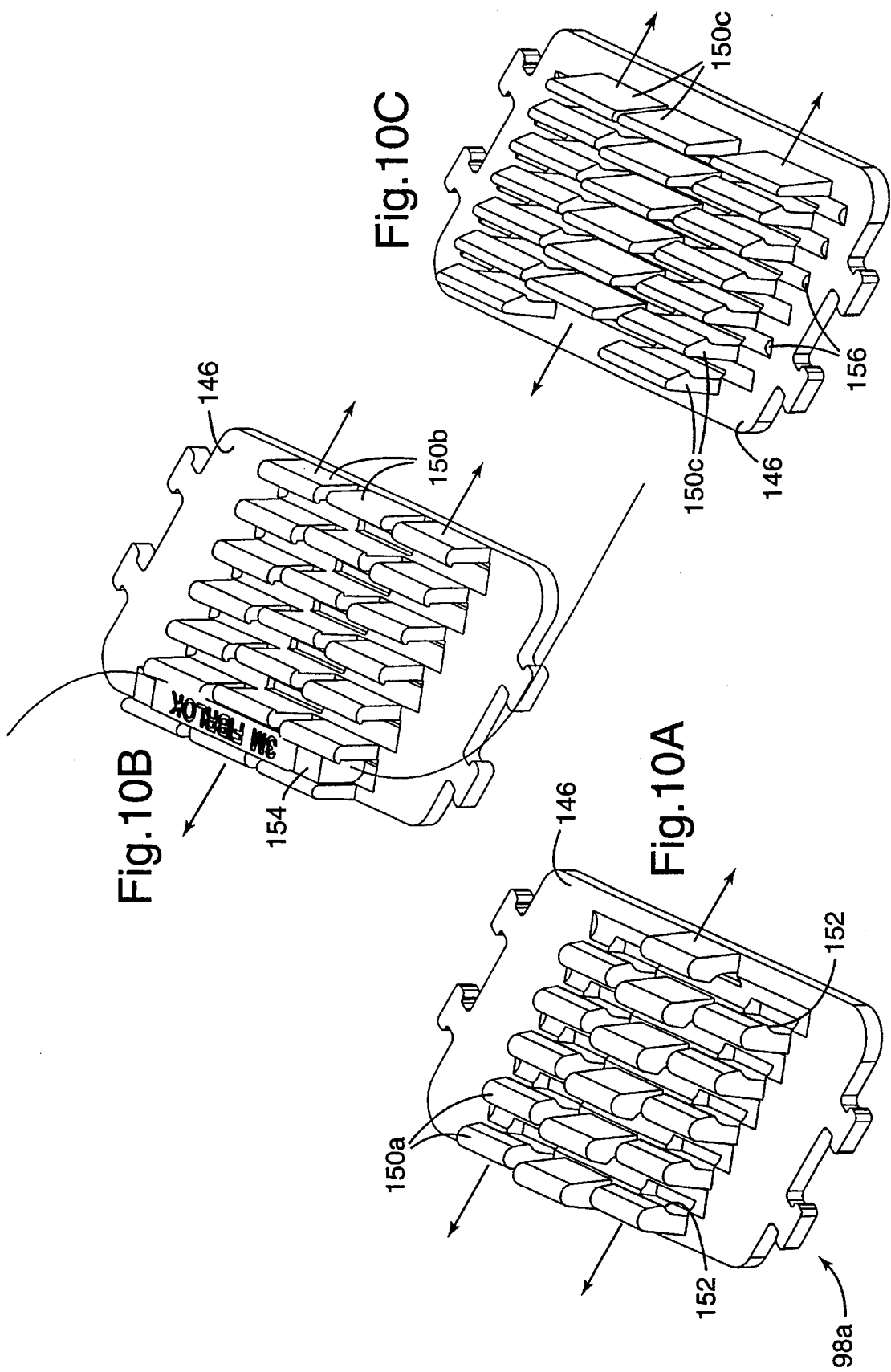

SHIELD BOND STRAIN CONNECTOR FOR FIBER OPTIC CLOSURE

BACKGROUND OF THE INVENTION

1. Field of the Invention

The present invention generally relates to devices used to physically attach cables and provide electrical continuity between grounding sheaths in the cables, and more particularly to a shield bond strain connector designed to secure the strength members found in fiber optic cables such as those used in telecommunications.

2. Description of the Prior Art

It is frequently necessary to join the ends of two cables, such as are used in telecommunications, to lengthen the cable system, branch off additional cables, or repair damaged cables. It is common to use enclosures to protect the joints, whether aerial, direct buried, above-ground or below ground (plant or hand hole). The enclosures are generally one of two types, in-line or butt-splice. In the butt splicing of fiber optic cables, several enclosure designs employ a dome shape, i.e., a closure body that is generally elongate, and has a closed end and an open end. Several such designs are depicted in U.S. Pat. Nos. 4,927,227, 5,222,183, 5,249, 253 and 5,278,933, and in PCT Application No. GB93/00157.

These closures use various clamps, bolts, ties, etc., to secure the cable near the open end of the closure. See U.S. Pat. Nos. 5,097,529, 5,280,556 and 5,288,946, and PCT Application Nos. US93/05742, GB93/01120 and GB93/01942. These elements provide strain relief against cable stresses caused by external cable movement relative to the closure. A cable that is pulled or pushed axially, twisted, or bent must not transmit that motion to the cable sheath opening inside of the closure. The prior art designs are less suited for fiber optic cables, however, since they include metallic components have sharp edges which can damage exposed fibers and their coatings. These designs also require many parts, increasing the cost of the closure, and sometimes require special tools for installation. The use of so many interconnecting parts additionally increases installation time.

Some prior art cable terminations use shield bond connectors to additionally secure the cable jacket, and to provide electrical continuity across grounding sheaths, using metallic braids. These connectors typically have an inner clamping member which fits inside the cable jacket, and an outer clamping member which grips the outer surface of the cable jacket, and a bolt or other means for forcing the two members together to clamp the jacket therebetween. See, e.g., U.S. Pat. Nos. 3,787,797, 4,895,525 and 5,097,529, PCT Application No. US94/04198 and German Patent No. 4,231,181. These designs are inadequate to rejoin the integrity of the cable jacket for both fiber optic and copper cables since, for example, they cannot adequately handle the strength members found in fiber optic cables, such as wires or aramid fibers. Indeed, it would be very useful to have a connector that allowed for easier conversion from copper shield bond to fiber shield bond.

In several of the foregoing designs, fiber optic storage trays, such as splice trays, are supported by or attached to the strain relief member or closure body. The storage trays usually include guide walls to maintain the fibers with a minimum bend radius. In the aforementioned '227, '183, and '253 patents, and in U.S. Pat. Nos. 5,323,480 and 5,363,466, several splice trays, stacked during storage, are hinged to a common base, in a stair-step fashion. U.S. Pat. No. 5,071,220 and PCT Application No. US94/04232 show in-line closures having trays hinged to a common base in this manner. In U.S. Pat. No. 5,323,478, the trays are stacked by means of hinging strips. These hinging arrangements still allow the fibers traveling between adjacent splice trays to become kinked when the tray is lifted, inducing microbend losses in the fiber. They also do not make the best use of space due to the stair-step geometry.

Fibers that are routed between trays are often protected in spiral wrap tubing or cylindrical tubing to keep the fibers from being physically damaged and to resist bending of the fiber to less than its minimum bend radius. Cylindrical tubing and spiral wrap both take a fair amount of time to install since, for cylindrical tubing, the fibers must be threaded through the tubing and, for spiral wrap, the wrap must be hand coiled about the fibers, which can be very difficult if a long length of fiber is present. With spiral wrap, it is also easy to pinch a fiber as it is wrapped. Prior art fiber breakout tubes further do nothing to keep ribbon fiber from unduly twisting.

Several of the splice trays shown in the aforementioned patents use splice cradles which retain a plurality of splice elements. See also U.S. Pat. Nos. 4,793,681, 4,840,449 and 4,854,661. The retention features can be molded directly into the tray surface, as disclosed in U.S. Pat. No. 5,074,635. Splice inserts can be removably attached to the trays, having retention features in the form of flexible cantilever latches for a snap fit; see U.S. Pat. Nos. 4,489,830, 4,679,896 and 5,375,185. These latches do not always firmly grip the splice elements, if many elements are present in adjacent grooves, due to the displacement and tolerance buildup of the material forming the retention feature. Repeated or extended use of the splice inserts can also lead to weakening of the retention members. In light of all of these problems, and particularly those associated with closures for fiber optic cables, it would be desirable and advantageous to devise a fiber optic closure having appropriate components to overcome the foregoing limitations.

SUMMARY OF THE INVENTION

The present invention provides a shield bond strain connector for a cable which has strength members therein, such as a fiber optic telecommunications cable having an outer jacket surrounding the strength members and optical fibers, the connector generally comprising (i) an inner clamping element positioned against an inner surface of the cable jacket, having a first mounting bolt, and a prong formed along an end of the inner clamping element, (ii) an outer clamping element positioned against an outer surface of the cable jacket, having a hole therein receiving the first mounting bolt, and being forcibly urged against the cable jacket toward the inner clamping element, (iii) a clamping plate having a second mounting bolt thereon, and (iv) a shield bond extension element having first, second and third holes therein, the first hole receiving the first mounting bolt, the second hole receiving the prong, affixing the extension element to the inner and outer clamping elements, while the third hole receives the second mounting bolt, securely fastening the strength members between the clamping plate and the extension element. The first mounting bolt extends the same direction as the second mounting bolt. The extension element has a narrowed end portion which is interposed between the inner and outer clamping elements, with the first hole being formed in the narrowed end portion. A flange formed on the clamping plate provides a positive stop and a friction fit with the top edge of the shield bond extension element. Each of these elements is preferably formed of a metallic material, such as tin-plated brass. The connector extends the shield bond and provides strain relief to the strength members located within the cable jacket.

BRIEF DESCRIPTION OF THE DRAWINGS

The invention will best be understood by reference to the accompanying drawings, wherein:

FIG. 3 is a perspective view of one embodiment of the strain relief member used with the closure of FIGS. 1 and 2;

FIG. 4 is an exploded perspective view of a shield bond strain connector of the present invention;

FIG. 5 is a perspective view of the shield bond strain connector of FIG. 4 installed on a cable;

FIGS. 10A–10C are perspective views of alternative splice inserts used in accordance with the present invention.

DESCRIPTION OF THE PREFERRED EMBODIMENT

Figure 1:
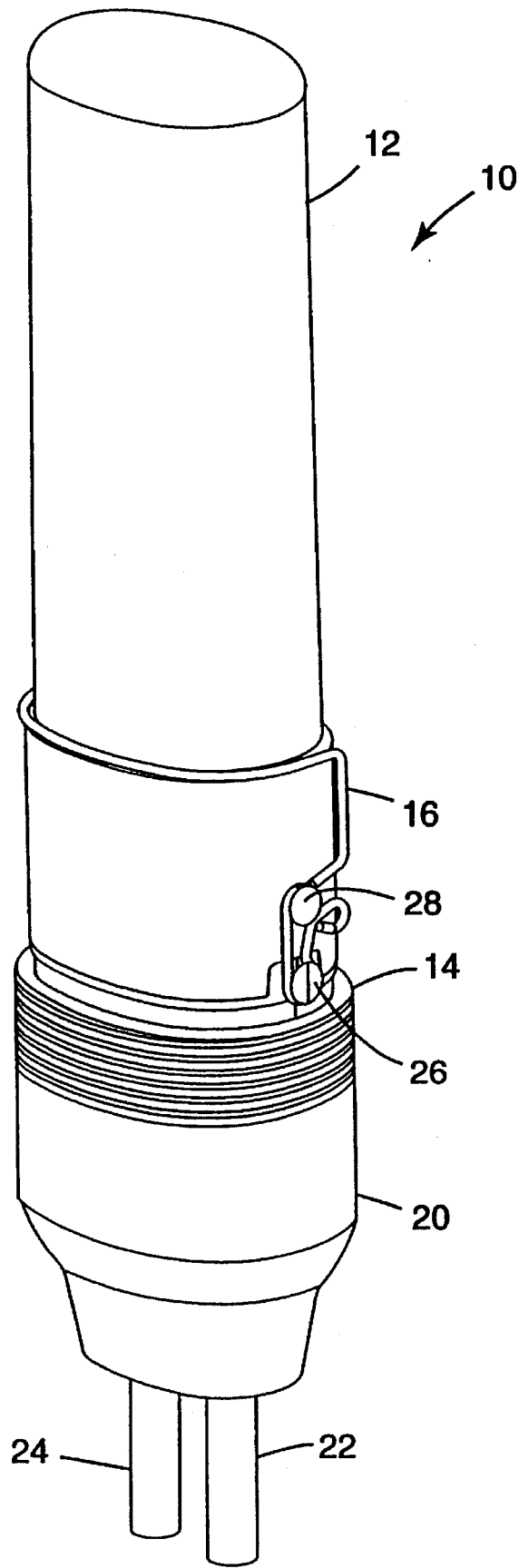
FIG. 1 is a perspective view of one embodiment of the fiber dome closure of the present invention, with two cables entering the closure.
Figure 2:
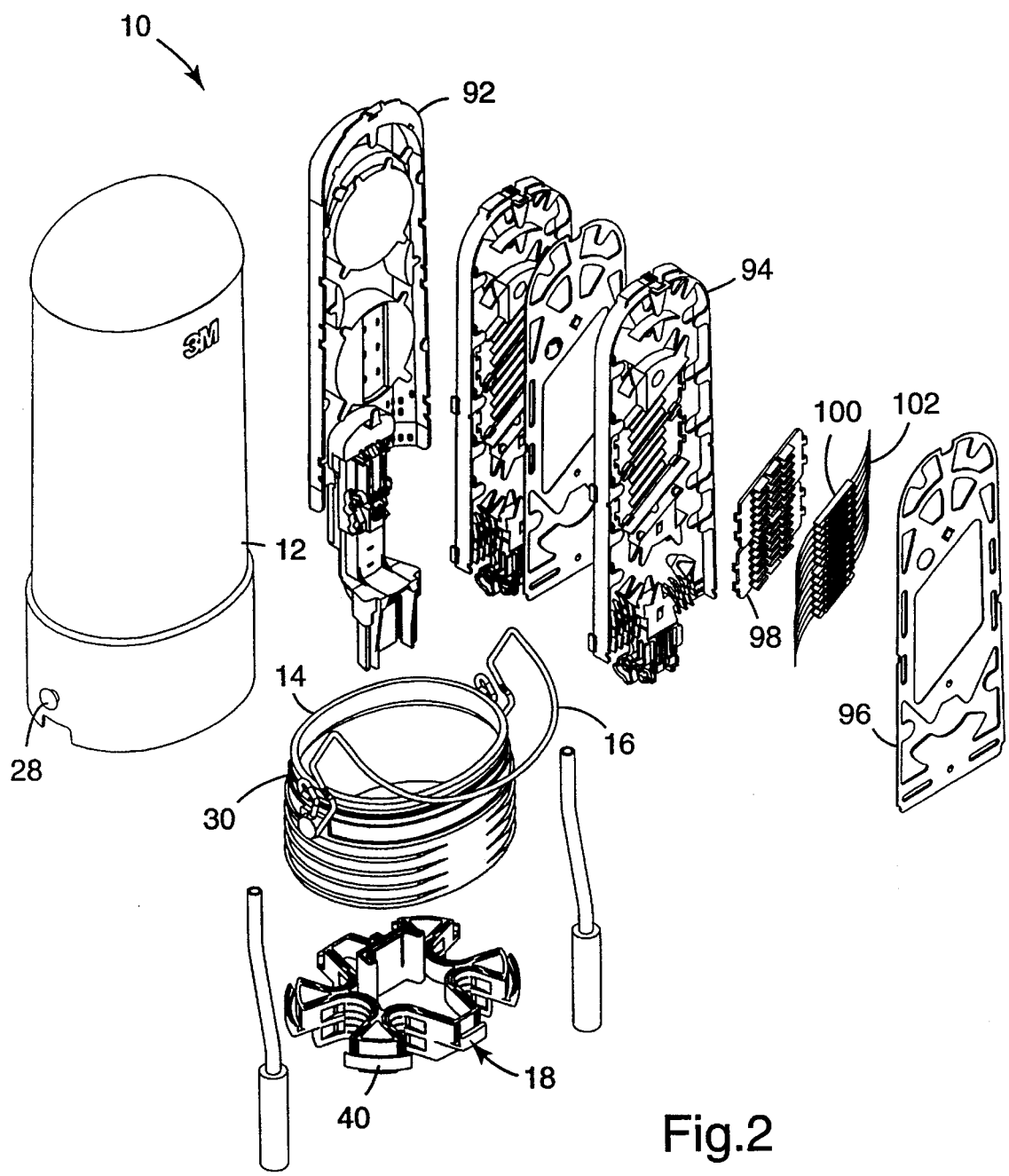
FIG. 2 is a exploded view of the closure of FIG. 1.

With reference now to the figures, and in particular with reference to FIGS. 1 and 2, there is depicted one embodiment 10 of the closure of the present invention. While this closure is particularly suited for use with fiber optic cables, many of the features described and claimed herein may be used with little or no modification in other applications, such as copper or coax. The disclosed embodiments have general use in fiber-in-the-loop applications, including pedestals, cabinets, hand holes, strand mount, or on poles. These applications could include closures for fiber drops at video nodes in hybrid fiber/coax networks, distribution closures or fiber drop closures for fiber-to-the-curb or fiber-to-the-home networks.

Closure 10 is generally comprised of an outer housing and an inner framework, the housing including an elongate, dome body 12 having a first, closed end and a second, open end, a tubular base 14 attached to the open end of dome body 12, a latch wire 16 for releasably securing body 12 to base 14, and a base plate or strain relief member 18 which is obscured in FIG. 1 by a pre-stretched tube (PST) 20. This housing construction is similar to 3M's Reenterable Dome Closure used for splices of copper wire, except for strain relief member 18. In the drawings, two cables 22 and 24 are shown entering closure 10, but the number of cables can vary. In the disclosed embodiment, strain relief member 18 has six cable ports designed to receive cables of varying diameters, and more than one cable may be placed in a single port if they are small diameter.

Dome body 12, base 14 and strain relief member 18 may be formed of any durable material, preferably a thermoplastic (injection-moldable) polymer such as polypropylene. The illustrated construction is an above-ground closure for butt splicing. PST 20 is preferably formed of an elastomer, such as EPDM, and is preloaded on a collapsible core, with either or both of its ends everted outwardly, i.e., wrapped backward on itself. After the cables are secured to strain relief member 18, and base 14 is positioned properly against member 18, PST 20 is placed about these two components and its core released, causing it to collapse about base 14 and strain relief member 18, and forming a tight, water-resistant seal along their interface. Ribs are provided along the outer surface of base 14 to engage PST 20. A gel end seal such as that shown in U.S. Pat. No. 5,258,578 may also be used. Access to the interior of closure 10 is thereafter provided by removing dome body 12 from base 14 using latch 16. Latch 16, which is preferably stainless steel, is pivotally attached to base 14 at two pins 26 formed with the base. Hairpin-shaped portions of latch 16 catch on corresponding pins 28 formed on body 12. The location of the hairpin-shaped portions and the positions of pins 26 and 28 are selected to cause body 12 to be forcibly urged against base 14 and form a tight seal therewith, the seal being further improved by an O-ring 30 which is placed near the top of base 14 in an annular groove 32 formed on the outer surface thereof. The diameter of O-ring 30 is matched to the width of groove 32 to provide an improved seal.

With further reference to FIG. 3, the strain relief member 18 of the present invention uses a novel design which provides strain relief for the cable(s) entering closure 10, and allows quick and simple installation. Strain relief member 18 includes a plate 34 having several cutouts, roughly U-shaped, forming cable ports 36, and allowing the cables to be placed in strain relief member 18 sideways, that is, without having to thread the cable through an opening. The plate has several outer surfaces 38, between adjacent ports 36, which coincide with the shape of the inner surface of base 14 such that strain relief member 18 may be placed partially inside base 14 and have a tight fit between the inner surface thereof and surfaces 38. A series of flanges or fingers 40 formed along surfaces 38 snap around the bottom edge of base 14 for a solid connection. Plate 34 also has a mounting fixture 42 for receiving the tray, back plate, terminal block, etc., which supports and stores the individual fibers (or wires) and associated interconnection devices. In the illustrated embodiment, mounting fixture 42 extends generally perpendicular to plate 34 and has a slot therein for receiving a tang or tab on the tray. The slot may be bent, or additional slots provided, for a more robust attachment.

A portion of the inner surface of the ports is provided with several rows of bumps or teeth 44 which bite into the cable jacket or fitting material to more securely grasp the cable. Near these teeth, along the inner surface of ports 36, there are two entry slots or openings 46 which receive cable ties 48 (see FIGS. 2 and 6) for further securing the cable, and two exit slots 50 for the ties. Respective pairs of slots 46 and 50 are joined by self-guiding channels formed inside the walls of ports 36. More slots can be provided for additional cable ties, or only one, but two is deemed optimal. This construction allows for the quick installation of most cables onto strain relief member 18 in three simple steps. First, cables ties 48 are threaded into openings 46 and pushed until a sufficient length extends from exits 50. Secondly, the cable is prepared, if necessary, for strain relief by wrapping the area to be clamped with a suitable fitting material, such as vinyl tape. Finally, with the cable in place in a port 36, ties 48 are cinched tightly using pliers or a cable tie gun. After all cables are so secured, strain relief member 18 is locked into base 14 with fingers 40 snapped firmly against the bottom edge of base 14. An end seal, such as those made of foam, may be used to provide resistance to water ingress.

The cable jackets may be further secured within closure 10, for example, attached directly to the support member which is mounted on fixture 42, using conventional clamping devices, including those which provide electrical continuity across grounding sheaths. If the cable is additionally provided with strength members (such as thick metallic wires or high-strength aramid fibers), then the modified shield bond strain connector 52 shown in FIGS. 4 and 5 may be used to secure these members. Connector 52 utilizes two conventional clamping elements 54 and 56 which secure the cable jacket 58. Inner clamping element 56 has a pin or bolt 60 which passes through a hole 62 in outer clamping element 54. Both elements 54 and 56 have a plurality of tangs or teeth 64 formed thereon for gripping jacket 58. A series of tabs or prongs, including a central prong 66, formed at the upper end of element 56 fit against complementary prongs 68.

The modification of connector 52 lies in the provision of two additional elements 70 and 72 which serve to extend the shield bond and provide strain relief for the cable strength members 74. Shield bond extension 70 has three holes 76, 78 and 80 therein. Hole 76 is formed in a narrowed end portion 82 of extension element 70 and receives bolt 60 when connector 52 is assembled (narrowed end portion 82 is interposed between inner and outer clamping elements 54 and 56). Hole 78 receives prong 66 of clamping element 56 which, with hole 76, serves to securely affix extension element 70 to clamping elements 54 and 56. Hole 80 is adapted to receive another bolt 84 formed on extension clamping plate 72, whereby the strength members 74 may be secured between plate 72 and extension element 70. Bolt 84, which extends the same direction as bolt 60 when extension element 70 is affixed to clamping elements 54 and 56, may be directly secured to the support member (or mounting fixture) inside closure 10. A flange 86 formed on the end of clamping plate 72 serves to further stabilize the connection by providing a positive stop and friction fit with the upper edge 88 of extension element 70. The sides 90 of clamping plate 72 are also bent to form flanges which similarly engage the sides of extension element 70. Clamping plate 72 may have two notches therein so that the strength members can be bent back over the plate, in the notches, for additional strain relief, and additional flanges may be provided, for example at the narrowed portion of element 70, to restrain the bent wires. Clamping plate 72 and extension element 70 are preferably formed of a metallic material such as a copper alloy, e.g., brass, preferably with a tin plating.

Connector 52 has several advantages. First, it can handle any kind of strength member, e.g., wires or aramid fibers. It does not allow strength members to bow or buckle (for example, due to thermal cycling) because they are held at short distances from the cable sheath opening. This attribute is particularly significant in fiber optic applications. Connector 52 can be attached to different types of existing shield bond connectors, for conversion from copper shield bond to fiber shield bond. Since it terminates the strength member close to the jacket opening, it can be easily isolated from the fiber management devices in closure 10. Finally, because it is similar to the prior art copper shield bond connectors, the transition for technicians from copper to fiber will be easier.

Referring again to FIG. 2, the inner framework of closure 10 may take on various forms, but advantageously includes a back plate or transition tray 92 and one or more splice trays 94 each having a cover 96 and one or more splice inserts 98 for receiving splices 100 interconnecting a plurality of optical fibers 102. The term "splice" often refers to the permanent interconnection of two transmission lines, as opposed to a "connector" which usually connotes a device which may be attached, detached, and re-attached, repeatedly if necessary. These terms should not be so construed in such a limiting sense as used herein, however, since the present invention is equally usable with both devices that permanently connect and devices that temporarily connect.

Figure 6:
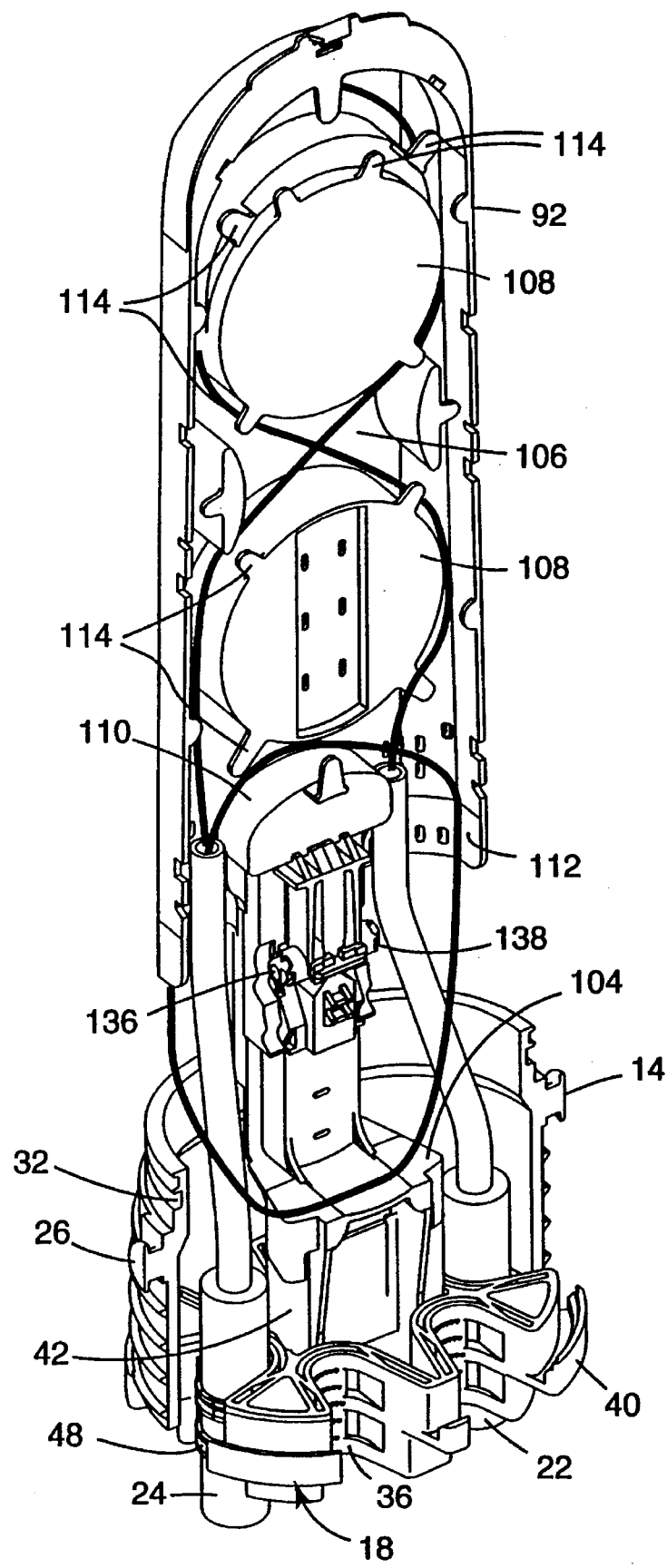
FIG. 6 is a perspective view of the closure of FIGS. 1 and 2 illustrating the transition tray.

Although only two splice trays 94 are depicted, more could be provided in larger embodiments of closure 10. Transition tray 92 is best seen in FIG. 6, and is elongate, having an attachment fixture 104 at one end for removable connection with mounting fixture 42 of strain relief member 18. Transition tray 92 has a floor 106 with two cylinders or spools 108 formed thereon for receiving coils of optical fiber slack, such as express fiber not used (spliced) at this location. Another curved wall 110 guides a fiber breakout tube 112 to one of the splice trays 94. Spools 108 and wall 110 maintain the optical fibers at a minimum bend radius. Tabs 114 may be used to retain the fibers in the tray. If there is sufficient room inside dome body 12, buffer tube fiber can be coiled on the plate's outer periphery and secured with cable ties. For single tubes, the tube is terminated and secured with cable ties at the entrance and loose fiber is stored inside transition tray 92. For express ribbon fiber, storage in "figure-8" patterns eliminates any twisting of the ribbons. Tray 92 is preferably deep enough to allow multiple crossovers of ribbons. A foam block may be attached to the back side of tray 92, such as within the cylinder formed by the molding of the upper spool 108, to support the trays when the closure is open, i.e., dome body 12 is removed, and the trays are extending horizontally. Another piece of foam, such as a foam donut, can be placed around the free ends of the trays or pre-positioned within the closed end of body 12 to provide resistance against vibrations and external impacts.

Figure 7:
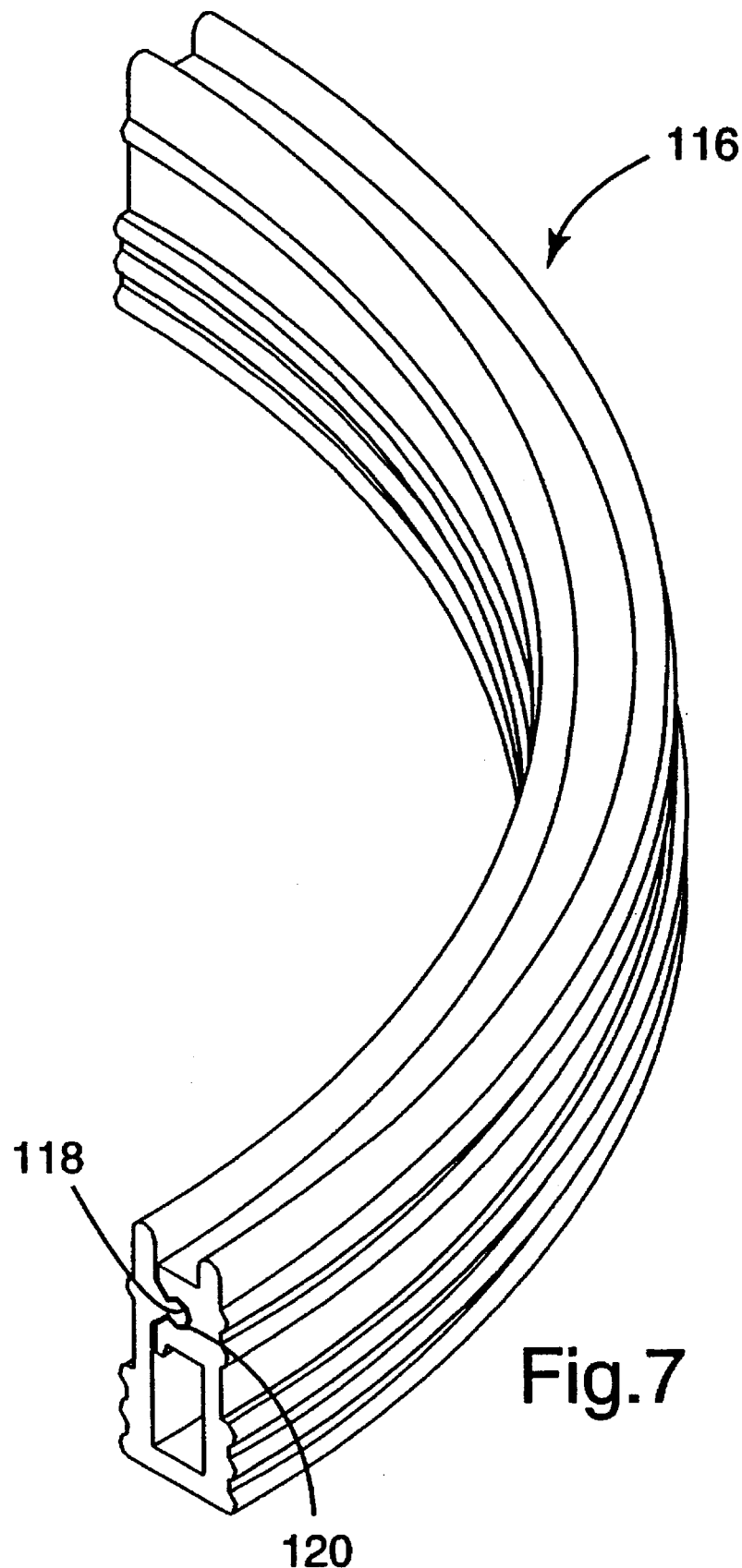
FIG. 7 is a perspective view of the end of a piece of the split fiber routing tube used in the present invention.

FIG. 7 illustrates a novel split tube 116 which may be used to route the fibers from transition tray 92 to a splice tray 94, or from one splice tray to another. Like prior art articles, fiber routing tube 116 keeps the fibers from being physically damaged, and resists bending the fiber to less than its minimum bend radius. Unlike cylindrical tubing or spiral wrap, tube 116 is particularly suited for ribbon fiber; 12 fiber ribbons stack neatly in the rectangular cross-section interior, and this shape allows little twisting of the ribbons. Additionally, it can be installed on the fibers much quicker than cylindrical tubing or spiral wrap, by using an interlocking, releasable seam comprised of a longitudinal spline 118 extending the full length of the seam, and a complementary groove 120. Spline 118 is enlarged or mushroomed at its tip, and groove 120 has a region of diminished width, to provide a dovetail or snap fit, but the material of tube 116 is sufficiently elastic (such as an EPDM/polypropylene blend) to allow the walls forming groove 120 to expand and allow spline 118 to fully enter groove 120 and seal tube 116 along its seam. Whatever tubing is used, it can advantageously travel below the tray pivot point to allow the fibers to move freely without catching on any hinges, and relax to their minimum stress state.

Figure 8:
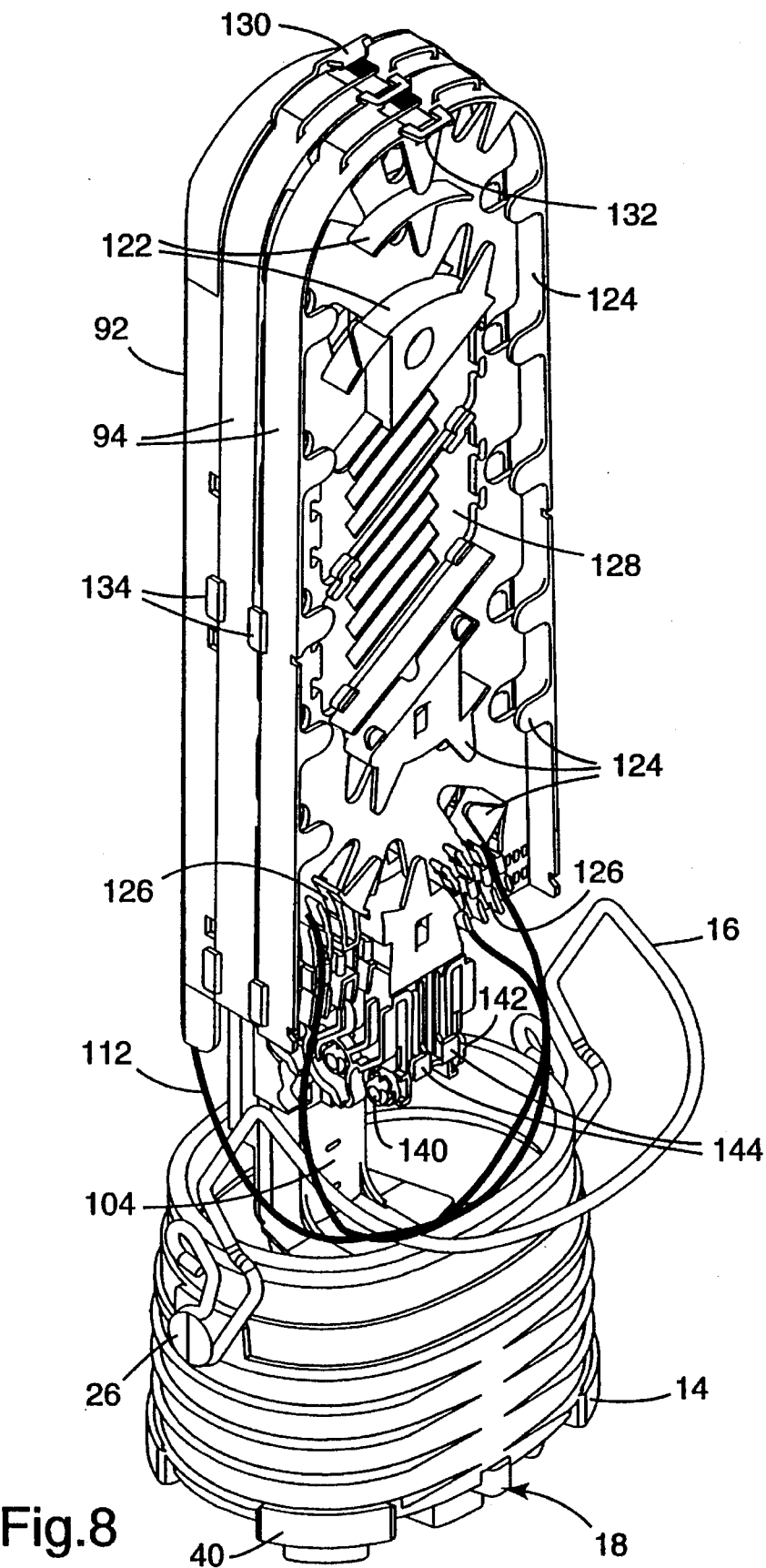
FIG. 8 is a perspective view of the closure of FIGS. 1 and 2 showing two splice trays attached to the transition tray of FIG. 6.
Figure 9:
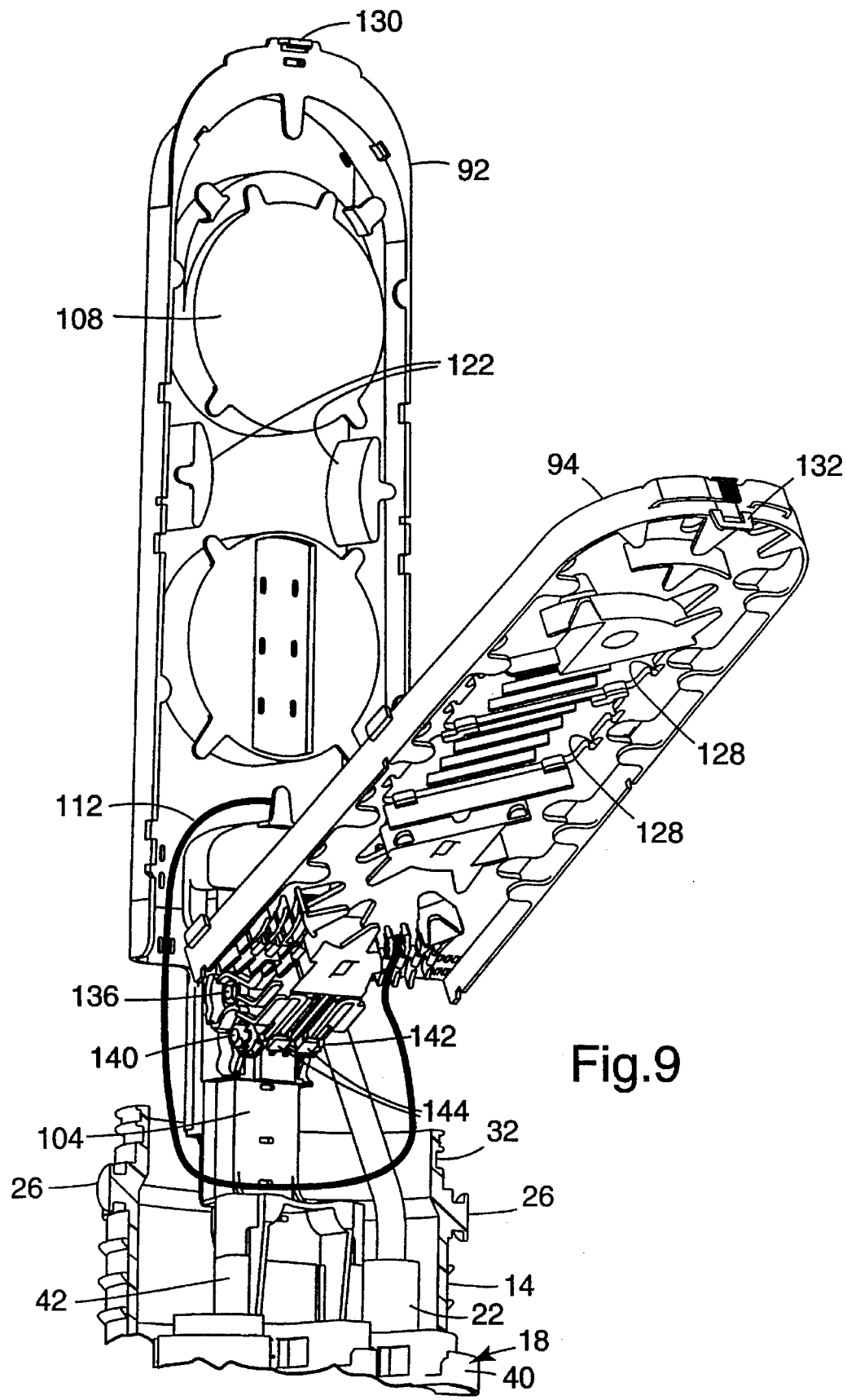
FIG. 9 is a perspective view similar to FIG. 8 but illustrating one splice tray held in an intermediate access position.

Referring now to FIGS. 8 and 9, splice trays 94 are preferably the same general shape and size of transition tray 92, and have similar structures, including arcuate walls 122 for guiding the fibers, tabs 124 for retaining them, and channels 126 for constraining the fiber breakout tubes. Trays 94 are also preferably deep enough to allow multiple crossovers of ribbons. Channels 126 may have a snap feature to secure the tubes, or be used with cable ties. Splice trays 94 also have one or more pad areas or depressions 128 for receiving splice inserts 98. A clip 130 may be provided on transition tray 92 to releasably secure the adjacent splice tray 94 in its storage position, and the splice trays 94 may be provided with similar clips 132. Overlapping tabs 134 formed on the sides of splice trays 94 help keep the trays neatly stacked. Transition tray 92 and splice trays 94 are preferably molded from an injection-moldable thermoplastic polymer such as polycarbonate. When used with the other thermoplastic components described above (body 12, base 14 and strain relief member 18), absolutely no metal components are exposed within closure 10, which is desirable for storage of all dielectric cable, and for metallic sheath cable. Connector 52 can be wrapped with, e.g., vinyl tape so that there is no exposed metal.

The use of an injection-moldable material also allows the tray hinge mechanism to be formed integrally with transition tray 92 and splice trays 94. Specifically, pivot pins 136 and 138 are formed in the upper surface of transition tray 92, and similar pivot pins 140 and 142 are formed in the upper surfaces of splice trays 94. These pins fit within hubs correspondingly positioned along the lower surfaces of the splice trays. Since these pins and hubs are formed at a common end of all of the trays, they can be accessed (inclined) without kinking the fibers routed around that end. The hubs have an outer wall with an irregular shape or detent, formed to bias the tray toward a position which is inclined 60° from the storage (flat) position, as shown in FIG. 9. The pivot pins are nested in a socket having an inner surface with the same irregular shape as the outer wall of the hub. This feature allows hands-free access to fibers in trays below the top one(s), and integrally molded pins allow the trays to be pivoted without kinking or breaking fibers that enter and exit the tray. To move a splice tray 94 back into alignment with the other trays, or flat against transition tray 92, two buttons 144 are pushed and the locking mechanism releases.

Several embodiments of the novel splice inserts 98 used with the present invention are shown in FIGS. 10A–10C. While inserts 98 are adapted to receive either fusion or mechanical splices, and for either discrete or ribbon fibers, they are equally suited to accommodate similar optical components such as couplers, splitters and attenuators. The insert 98a depicted in FIG. 10A is designed for use with mass fusion splices, and includes a base or pad 146 having a shape generally corresponding to depressions 128 formed in splice trays 94 which, in the preferred embodiment, is rectangular or parallelogram. Ears 148 formed at the ends of pad 146 mate with correspondingly-shaped cutouts formed in tray 94 to help retain insert 98a in depression 128. Other means could be provided to attach the pads to the trays, such as pressure-sensitive adhesive. Insert 98a has a plurality of fingers or arms 150a which are positioned to form a series of parallel nests or grooves for receiving individual splice elements. Arms 150a are staggered to provide a multi-point load on the splice elements, and are preferably constructed of an elastic material such as natural and synthetic rubbers, polyurethane, EPDM (or blends thereof with polypropylene), Neoprene or nitrile. Each of arms 150a has a flange or hook 152 formed thereon, with the hooks along a given side of a splice element alternatively facing opposite directions; thus, in the depicted embodiment wherein three arms are provided on each side of the splice element, a given element is gripped by two hooks facing the same direction at its ends, and by a third hook facing the opposite direction at its center.

FIG. 10B illustrates an alternative splice insert 98b adapted for use with discrete mechanical splices, such as the FIBRLOK splice 154 (FIBRLOK is a trademark of 3M). Arms 150b are similar to arms 150a although they are thinner than arms 150a and the hooks are less pronounced. In FIG. 10C, splice insert 98c has been adapted for use with discrete fusion splice elements 156, and its arms 150c are nearly triangular in cross-section, with a lower corner missing to form the hook feature. Two layers of discrete fusion splices can be stacked in the grooves of insert 98c to double its capacity, to twelve elements in the depicted embodiment.

The present invention eliminates the requirement in prior art splice inserts of added relief areas for displaced rubber, and avoids the tolerance build-up problems associated with elimination of these relief areas, in turn reducing the overall size of the insert, and enhancing and equalizing the retaining force on the splice elements. This is achieved by providing staggered arms which are also flexible, having a hardness in the range of 30 Shore A to 50 Shore D, preferably in the range of 60–80 Shore A, and most preferably about 70 Shore A. The construction of inserts 98a–98c allow for easy insertion and removal of the splice element without damaging the element or the interconnected fibers.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, nearly all of the components can be used with in-line closures as well as dome closures. It is therefore contemplated that such modifications can be made without departing from the spirit or scope of the present invention as defined in the appended claims.

I claim:

1. A shield bond strain connector for use with a cable jacket connector and a cable having strength members, the shield bond strain connector comprising:

a clamping plate having a mounting bolt attached thereto; and a shield bond extension element having first, second and third holes therein, said first hole positioned to receive a mounting bolt of the cable jacket connector, and said second hole positioned to receive a prong of the cable jacket connector, such that said extension element is affixed to the cable jacket connector when the mounting bolt thereof is engaged in said first hole and when the prong thereof is engaged in said second hole, said third hole further being positioned to receive said mounting bolt of said clamping plate such that the strength members of the cable may be securely fastened between said clamping plate and said extension element.

2. The shield bond strain connector of claim 1 wherein said extension element and said clamping plate are formed of a metallic material.

3. The shield bond strain connector of claim 2 wherein said metallic material is brass.

4. The shield bond strain connector of claim 1 wherein:

the cable jacket connector includes inner and outer clamping elements, the mounting bolt thereof being formed on the inner clamping element and sized to pass through a hole in the outer clamping element; and said extension element is flat and is interposed between the inner and outer clamping elements of the cable jacket connector when the mounting bolt thereof is engaged in said first hole and when the prong thereof is engaged in said second hole.

5. The shield bond strain connector of claim 4 wherein said mounting bolt of said clamping plate extends the same direction as the mounting bolt of the inner clamping element when said extension element is affixed to the cable jacket connector and said mounting bolt of said clamping plate is engaged in said third hole of said extension element.

6. The shield bond strain connector of claim 4 wherein said extension element has a narrowed end portion which is interposed between the inner and outer clamping elements of the cable jacket connector.

7. The shield bond strain connector of claim 4 further comprising flange means formed on said clamping plate for providing a friction fit with said shield bond extension when said mounting bolt of said clamping plate is engaged in said third hole of said extension element.

8. The shield bond strain connector of claim 7 wherein said extension element has a narrowed end portion which is interposed between the inner and outer clamping elements of the cable jacket connector.

9. The shield bond strain connector of claim 8 wherein said mounting bolt of said clamping plate extends the same direction as the mounting bolt of the inner clamping element when said extension element is affixed to the cable jacket connector and said mounting bolt of said clamping plate is engaged in said third hole of said extension element.

10. The shield bond strain connector of claim 1 further comprising flange means formed on said clamping plate for providing a friction fit with said shield bond extension element when said mounting bolt of said clamping plate is engaged in said third hole of said extension element.

11. An article for securing a portion of a cable jacket to a support member, the article including an inner clamping element, an outer clamping element, means for forcibly securing the inner clamping element to the outer clamping element with the portion of the cable jacket interposed therebetween, and means for attaching the inner and outer clamping elements to the support member, the inner and outer clamping elements together forming a shield bond, the improvement comprising means for extending the shield bond and for providing strain relief to strength members located within the cable jacket, including:

a clamping plate having a mounting bolt attached thereto; and a shield bond extension element having first, second and third holes therein, said first hole positioned to receive a mounting bolt attached to the inner clamping element, and said second hole positioned to receive a prong on the inner clamping element, such that said extension element is affixed to the inner clamping element when the mounting bolt thereof is engaged in said first hole and when the prong thereof is engaged in said second hole, said third hole further being positioned to receive said mounting bolt of said clamping plate such that the strength members may be securely fastened between said clamping plate and said extension element.

12. The article of claim 11 further comprising flange means formed on said clamping plate for providing a positive stop against said shield bond extension element when said mounting bolt of said clamping plate is engaged in said third hole of said extension element.

13. The article of claim 12 wherein:

said mounting bolt of said clamping plate extends the same direction as the mounting bolt of the inner clamping element when said extension element is affixed to the inner clamping element and said mounting bolt of said clamping plate is engaged in said third hole of said extension element; and said extension element has a narrowed end portion which is interposed between the inner and outer clamping elements.

14. The article of claim 11 wherein said mounting bolt of said clamping plate extends the same direction as the mounting bolt of the inner clamping element when said extension element is affixed to the inner clamping element and said mounting bolt of said clamping plate is engaged in said third hole of said extension element.

15. The article of claim 11 wherein said extension element has a narrowed end portion which is interposed between the inner and outer clamping elements.

16. An enclosed cable termination comprising:

a cable having a plurality of optical fibers, a cable jacket surrounding said fibers, and at least one strength member within said cable jacket;

a closure having a support member therein; and a shield bond strain connector including an inner clamping element positioned against an inner surface of said cable jacket, having a first mounting bolt, and having a prong formed along an end thereof, an outer clamping element positioned against an outer surface of said cable jacket, having a hole therein receiving said first mounting bolt, and being forcibly urged against said cable jacket toward said inner clamping element, said first mounting bolt being secured to said support member, a clamping plate having a second mounting bolt thereon, and a shield bond extension element having first, second and third holes therein, said first hole receiving said first mounting bolt, said second hole receiving said prong, affixing said extension element to said inner and outer clamping elements, and said third hole receiving said second mounting bolt, securely fastening the strength member between said clamping plate and said extension element.

17. The cable termination of claim 16 further comprising flange means formed on said clamping plate providing a positive stop against said shield bond extension element.

18. The cable termination of claim 16 wherein said first mounting bolt extends the same direction as said second mounting bolt.

19. The cable termination of claim 16 wherein said extension element has a narrowed end portion which is interposed between the inner and outer clamping elements, said first hole being formed in said narrowed end portion.

* * * * *